2,893,834
Patented July 7, 1959

2,893,834
PROCESS FOR PRODUCING DEFLUORINATED CALCIUM PHOSPHATES

Woodrow W. Richardson, Auburndale, Fla., assignor to International Minerals & Chemical Corporation, a corporation of New York No Drawing. Application February 18, 1957
Serial No. 640,608

4 Claims. (Cl. 23—109)

This invention relates to the defluorination of natural phosphate materials. More particularly, it relates to the manufacture of defluorinated phosphates useful as animal feed or animal feed supplement providing both needed phosphorus and calcium. Still more particularly, it relates to the manufacture of defluorinated phosphate rock.

Mineral phosphates of all the natural deposits in the United States and in most foreign countries occur in the form of apatite containing too much fluorine to permit their use as feed material without processing to reduce the content of objectionable fluorine from an original approximately 3.0 to about 3.8% to below about 0.1% in a phosphate feed containing about 30% $P_2O_5$.

In prior processes designed to reduce the fluorine content of ground natural phosphate rock to less than 0.1%, phosphate rock either alone or mixed with sulfuric acid, phosphoric acid, silica and the like have been calcined at temperatures ranging from 1800° F. to 2700° F. Some of the prior art teaches that the presence of water vapor assists in defluorination. Butt, U.S. Patent No. 2,442,969 for example, shows use of a gaseous medium of 60% relative humidity which corresponds to about 2 volume percent. These processes accomplish reduction of fluorine, but sacrifice availability of $P_2O_5$. Citrate solubility of the calcined products have been of the order of 10% to 60% of the total $P_2O_5$.

It is a primary object of this invention to overcome the shortcomings and disadvantages of processes heretofore in use.

It is a further object of this invention to provide a process wherein calcined rock mixtures of improved P/F weight ratio are obtained.

It is another object of this invention to provide a method of defluorinating calcium phosphates wherein the defluorination is accomplished in a single or multiple stage calcining operation to produce products having the $P_2O_5$ in the substantially orthophosphate form desirable for animal feeds and a P/F weight ratio in excess of 100. These and other objects of the invention will be apparent to those skilled in the art from the following description.

It has been discovered that superior defluorination and improved citrate solubility of calcium phosphates can be obtained if the calcination of phosphate mixtures is carried out with a gaseous medium in contact with the agitating solids containing a volume percent of water vapor between the limits of approximately 5 and approximately 30%. In the process of this invention, phosphate rock and mole ratio balancing salts such as oxygen-bearing salts of calcium and/or volatile anion salts of alkali metals are mixed with phosphoric acid so that in the final product the mole ratio represented by the following formula is between about 2.5 and 3.8.

$$\frac{\text{Moles}}{\text{Moles}} = \frac{CaO + MgO + Na_2O + K_2O - SO_3 - F_2}{P_2O_5 - Fe_2O_3 - Al_2O_3}$$

Where the amounts of the substance are expressed in moles (computed in each instance by dividing the total weight of each substance by its molecular weight), acidic constituents such as $SO_3$ and $F_2$ are subtracted from the moles of CaO and other alkaline constituents as indicated by minus signs; and the mole ratio of alkali metal oxide to $P_2O_5$ is between about 0.15:1 and 0.6:1. This mix is heat treated in a calcining operation at temperatures in the range between about 2300° F. and about 2700° F. while maintaining the agitating solids in contact with a gaseous atmosphere containing water vapor.

Preparatory to heat treatment, phosphate rock, oxygen-bearing salts of calcium and/or volatile anion salts of alkali metals are dry-blended in suitable equipment such as a Ross paddle mixer or Simpson mixer-muller and then the phosphoric acid added during an additional agitating period. In a single stage calcining operation, this dry-blending uniform distribution of materials is an essential. By dry-blending the solid ingredients first and then continuing to agitate during the addition of phosphoric acid, a feed for the calciner is obtained which is sufficiently uniform.

With phosphate rock containing 3% or more of fluorine, effective defluorination in a single calcining operation, i.e., reduction of fluorine content to about 0.4% or less, requires careful control of the heat treatment temperature and of the temperature of the solids when discharged from the calciner, if the product is to have a high citrate soluble $P_2O_5$ content. In addition, the alkali metal oxide to $P_2O_5$ mole ratio has a marked effect upon the ease of defluorination of mixtures being calcined at the temperatures hereinafter discussed. For mixtures of the same $CaO/P_2O_5$ mole ratio of ingredients, increasing the alkali metal salt content of the mix results in a reduction of the fluorine content of the calcined product. Alkali metal salt is most effective when calcining the more difficult to defluorinate mixtures, i.e., those with calculated mole ratios above about 3.5. For a mixture of CaO to $P_2O_5$ mole ratio of 3.5, calculated according to the above formula, increasing the $Na_2O/P_2O_5$ mole ratio from substantially 0 to 0.27:1, improves the P/F of the calcined product about 10 fold, i.e., from about 15 to approximately 150.

Alkali metal oxide to $P_2O_5$ mole ratio has a marked effect upon the citrate solubility of the $P_2O_5$ content of the calcined products. Products of the same calculated mole ratio show markedly increased percentages of the total $P_2O_5$ which are citrate soluble when the alkali metal to $P_2O_5$ mole ratio is increased from about 0.15:1 up to about 0.6:1. At alkali metal oxide/$P_2O_5$ mole ratios of substantially 0, the citrate solubility of a calcined mix of $CaO/P_2O_5$ mole ratio of 3:1 and 3.5 were 15 and 20% respectively. At an alkali metal oxide/$P_2O_5$ mole ratio of 0.3, the citrate solubility of the mix after calcining, was 80% and 88% respectively. At 0.6, the citrate solubility of calcined products is about 95 to 100%.

Alkali metal salt added to the mix may be soda ash, sodium nitrate, sodium formate, sodium chlorate, potassium carbonate, potassium sulfate, and the like.

Adjustment of the calcium to $P_2O_5$ ratio, if necessary, may be made by addition of lime, limestone, calcium nitrate, calcium formate, and the like.

Mixtures balanced to have a mole ratio in the above range is fed to a calciner such as a rotary kiln for the heat treatment operation. The calciner may be of the type where the hot combustion gases and the flame of the burner are directed into the product discharge end of the kiln or the heating may be the indirect type. The mixture during the calcining must be maintained, if there is to be effective defluorination, in an atmosphere containing water vapor.

In the calciner, temperature of the solids must be controlled at the hot point so as to avoid fusion or melting which will cause ringing in the kiln. On the other hand, the temperature must be high enough to volatilize fluorine and to cause the $P_2O_5$ content to be in the alpha-tricalcium form. The high temperature of solids in the calciner should be in the range between about 2200° F. and about 2700° F. depending upon the fusion temperature of the particular mix, and preferably between about 2400° F. and about 2550° F. at which temperature none of the compositions encompassed by the above mole ratio limitations will be fused if the composition has been rendered properly uniform during the blending operation.

The effect of water vapor in the gaseous atmosphere during the calcining operation may be illustrated in a graph by plotting the weight ratio of phosphorus to fluorine as the ordinate and volume percent of water vapor as the abscissas. Another graph may be drawn plotting the percentage of the total $P_2O_5$ which is citrate soluble as the ordinate and volume percent water vapor in the gas as the abscissas.

The effect of water vapor on fluorine removal was determined by preparing a mixture having a calculated mole ratio of approximately 3.4 with no added alkali metal salt. This mixture was subdivided into a number of portions, each of the portions was calcined at a temperature of 2500° F. with a holding time of 1 hour. Each portion being maintained in an atmosphere of predetermined moisture content. To a portion of this master mix was added sufficient sodium carbonate to give a calculated mole ratio of 3.6 and an alkali metal oxide to $P_2O_5$ mole ratio of 0.27:1. This alkali containing mix was subdivided into a number of portions and calcined under the same conditions as the master mix. Gaseous atmosphere for passage through the calciner was prepared by mixing a stream of air with the desired quantity of steam to attain the volume percent water vapor desired and this gaseous steam mixture passed through a preheater so that upon injection into the calciner, it would not cool the heated solids.

Determination of the citrate solubility was made in a manner similar to that for fluorine, a master mix being prepared having no added alkali metal salt and calcining the portions of the master mix at various water vapor content levels and then preparing a secondary mix containing alkali to give a sodium $Na_2O$ to $P_2O_5$ mole ratio of approximately 0.25 with various portions of this material being calcined in an atmosphere containing various percentages of water vapor.

When plots are made in the manner described above, from a study of the plots it can be seen that the water vapor rang of 5% to 30% is critical both for superior defluorination and for improved citrate solubility.

At the discharge of the kiln, the solids should be in the alpha-tricalcium form. If the solids temperature at discharge is below 1900° F., the $P_2O_5$ content of the product will have reverted to the undesirable beta-tricalcium form. Solids therefore, are preferably discharged from the kiln at temperatures in the range between about 2000° F. and about 2200° F.

When operating at temperatures in the above-described ranges, the residence time of material passing through the kiln should be of the order of 45 to 90 minutes to insure attainment of the proper degree of defluorination and to insure thorough heating of the solids in order that the phosphate will all have attained the available alpha-tricalcium form.

Upon discharge from the calciner at a temperature in the range of 1900 to 2200° F., the solids are subjected to a rapid cooling or quenching to maintain the phosphate material in the alpha crystalline form. The quick quench of the calcined material is necessary and if allowed to air cool, a markedly lower percent of available $P_2O_5$ will be found in the product. This quenching should reduce the temperature of the material to below 900° F.

The quenching of this material may be accomplished in any suitable manner. One method is to direct the discharged calcined material into a large body of water. The second method of quenching is to direct a jet or plurality of jets of water into the discharged stream of solids.

Total $P_2O_5$ content of the products was determined in accordance with the Methods of Analysis for Fertilizer established by the Association of Official Agricultural Chemists as shown in the 6th edition, 1945, page 21.

The orthophosphate content of products was determined as follows:

Weigh .4 gram sample into 600 ml. beaker, add 400 ml. .4%[1] HCl. Stir for 2 hrs., in water bath, 98–99° F. Transfer to a 500 ml. volumetric flask, cool and make to volume. Shake to mix and filter on dry filter. Pipette two 50 ml. samples into 250 ml. beakers. Add 50 ml. of ammonium nitrate at room temperature to first sample, then place on stirring rack. While stirring, add 50 ml. of ammonium molybdate solution and stir for 40 minutes. After sample #1 has been stirring for 20 minutes, repeat above procedure on sample #2 stirring it only 20 minutes so that two samples finish stirring at same time. Filter thru asbestos pad, wash six times with distilled $H_2O$, place sample back in beaker and titrate as for ordinary $P_2O_5$ sample.

($P_2O_5$ in #2) − ($P_2O_5$ in #1 − $P_2O_5$ in #2) = ortho $P_2O_5$

In order to give a fuller understanding of the invention, but with no intention to be limited thereto, the following specific example is given to illustrate the character of the invention herein described.

*Example*

A Florida phosphate rock containing 35.1% $P_2O_5$ was ground to a size such that all of it passed through a 100 mesh standard screen. To 1000 parts by weight of phosphate rock was added 273 parts by weight of 52.2% $P_2O_5$ phosphoric acid, 190 parts by weight of calcium carbonate, and 91 parts by weight of sodium carbonate. This mixture was dried and comminuted so that all of the mix passed through a 20 mesh standard screen. The mix was calcined at a temperature of 2500° F. Air, having a relative humidity of 80%, was mixed with steam in quantities sufficient to raise the vapor content of the gaseous mixture to 10% of the total volume. This air-water vapor mixture was preheated to a temperature of approximately 2000 to 2500° F. before passage through the calciner (after 45 minutes at temperature in the calciner, the product was withdrawn and quenched). This final product had a mole ratio calculated according to the formula of 3.7 and an $Na_2O$ to $P_2O_5$ mole ratio of 0.25:1, a fluorine content of 0.14% and a P/F weight ratio of 123:1.

Having thus fully described my invention, what I claim is:

1. The improved process for producing a calcium phosphate animal feed ingredient containing less than 0.1% fluorine which comprises mixing comminuted phosphate rock with volatile salts of alkali metals, whose negative radical is selected from the group consisting of carbonate, nitrate, formate, chlorate and sulfate, and with phosphoric acid so that for the final product the mole ratio represented by the following formula is between 2.5 and 3.8, $$\frac{\text{Moles}}{\text{Moles}} = \frac{CaO + MgO + Na_2O + K_2O - SO_3 - F_2}{P_2O_5 - Fe_2O_3 - Al_2O_3}$$

and the mole ratio of alkali metal oxide to $P_2O_5$ is higher than about 0.2 and calcining the mixture at a temperature of not less than 1900° F. while actively agitating the same in contact with a gaseous atmosphere containing between about 5 mole percent and 30 mole percent of water vapor and quenching the calcined product before the temperature of the product falls below 1900° F.

2. The improved process for producing a calcium phos-

---

[1] Approx. 36.3 ml. conc. HCl in 4 liters $H_2O$.

phate animal feed ingredient containing less than 0.1% fluorine which comprises mixing comminuted phosphate rock with volatile salts of alkali metals, whose negative radical is selected from the group consisting of carbonate, nitrate, formate, chlorate and sulfate, and with phosphoric acid so that for the final product the mole ratio represented by the following formula is between 2.5 and 3.8, $$\frac{\text{Moles}}{\text{Moles}} = \frac{CaO + MgO + Na_2O + K_2O - SO_3 - F_2}{P_2O_5 - Fe_2O_3 - Al_2O_3}$$

and the mole ratio of alkali metal oxide to $P_2O_5$ is higher than about 0.2 and calcining the mixture at a temperature in the range of about 1900° F. and 2700° F. while actively agitating the same in contact with a gaseous atmosphere containing between about 5 mole percent and 30 mole percent of water vapor and quenching the calcined product before the temperature of the product falls below 1900° F.

3. The improved process for producing a calcium phosphate animal feed ingredient containing less than 0.1% fluorine which comprises mixing comminuted phosphate rock with volatile salts of alkali metals, whose negative radical is selected from the group consisting of carbonate, nitrate, formate, chlorate and sulfate, and with phosphoric acid so that for the final product the mole ratio represented by the following formula is between 2.5 and 3.8, $$\frac{\text{Moles}}{\text{Moles}} = \frac{CaO + MgO + Na_2O + K_2O - SO_3 - F_2}{P_2O_5 - Fe_2O_3 - Al_2O_3}$$

and the mole ratio of alkali metal oxide to $P_2O_5$ is between about 0.25:1 and 0.6:1 and calcining the mixture at a temperature in the range of about 1900° F. and 2700° F. while actively agitating the same in contact with a gaseous atmosphere containing between about 5 mole percent and 30 mole percent of water vapor and discharging the calcined solids from the calciner at a temperature higher than 1900° F. and quenching the calcined product before the temperature of the product falls below 1900° F.

4. The improved process for producing a calcium phosphate animal feed ingredient containing less than 0.1% fluorine which comprises mixing comminuted phosphate rock with soda ash and with phosphoric acid so that for the final product the mole ratio represented by the following formula is between 2.5 and 3.8, $$\frac{\text{Moles}}{\text{Moles}} = \frac{CaO + MgO + Na_2O + K_2O - SO_3 - F_2}{P_2O_5 - Fe_2O_3 - Al_2O_3}$$

and the mole ratio of alkali metal oxide to $P_2O_5$ is between 0.15:1 and 0.6:1 and calcining the mixture at a temperature in the range of about 1900° F. and 2700° F. while actively agitating the same in contact with a gaseous atmosphere containing between about 5 mole percent and 30 mole percent of water vapor and discharging the calcined solids from the calciner at a temperature higher than 1900° F. and quenching the calcined product before the temperature of the product falls below 1900° F.

References Cited in the file of this patent
UNITED STATES PATENTS

| | | |
|---|---|---|
| 2,442,969 | Butt | June 8, 1948 |
| 2,556,541 | Hollingsworth | June 12, 1951 |
| 2,562,718 | Hollingsworth | July 31, 1951 |
| 2,565,351 | Butt | Aug. 21, 1951 |